United States Patent
Nicolay et al.

(10) Patent No.: US 6,708,473 B2
(45) Date of Patent: Mar. 23, 2004

(54) LAWNMOWER HANDLE ASSEMBLY (75) Inventors: Kenneth M. Nicolay, Fairway, KS (US); Lawrence E. Guerra, Shawnee, KS (US)

(73) Assignee: Nicolay Family Enterprises, L.L.C., Fairway, KS (US)

(*) Notice: Subject to any disclaimer, the term of this patent is extended or adjusted under 35 U.S.C. 154(b) by 0 days.

(21) Appl. No.: 10/210,973

(22) Filed: Aug. 2, 2002

(65) Prior Publication Data
US 2002/0189225 A1 Dec. 19, 2002

Related U.S. Application Data (63) Continuation-in-part of application No. 09/707,639, filed on Nov. 7, 2000, now Pat. No. 6,449,935.

(51) Int. Cl.$^7$ .............................................. A01D 34/66
(52) U.S. Cl. ...................................................... 56/16.7
(58) Field of Search ...................... 56/1, 2, 16.7, 17.2, 56/17.5, 17.1, 16.8, 320.1, 320.2, DIG. 9, DIG. 18; 280/727, 47.34, 47.35

(56) References Cited

U.S. PATENT DOCUMENTS

| | | |
|---|---|---|
| 857,859 A | 6/1907 | Barney |
| 1,201,721 A | 10/1916 | Hagquist |
| 1,368,503 A | 2/1921 | Kallauner |
| 2,421,558 A | 6/1947 | Goldsmith |
| 2,477,442 A | 7/1949 | Cramer, Jr. et al. |
| 3,243,196 A | 3/1966 | Amis |
| 3,292,351 A | * 12/1966 | Larson et al. ................. 56/17.2 |
| 3,564,823 A | 2/1971 | Rhoads |
| 4,077,191 A | 3/1978 | Pittinger, Sr. et al. |
| 4,422,283 A | * 12/1983 | Scanland ................... 56/320.2 |
| 4,678,042 A | 7/1987 | Barton et al. |
| 5,761,887 A | 6/1998 | Hanson |

* cited by examiner

Primary Examiner—Robert E. Pezzuto
(74) Attorney, Agent, or Firm—Erickson & Kleypas, L.L.C.

(57) ABSTRACT

A handle assembly for an appliance such as a lawnmower having front and rear wheels includes a handlebar having a pair of legs pivotally connected to the appliance at front mounting points proximate the front wheels. The handlebar extends upwardly and rearwardly until it terminates with a push bar adapted for gripping by the operator. The handlebar preferably includes a front crossbar connected between the legs forward of the center of gravity of the appliance. The handle assembly also includes a handle height control mechanism which is connected at a lower end to the lawnmower proximate the rear wheels and at an upper end to the handlebar. The handle height control mechanism allows the handlebar to pivot about the front mounting point through a limited range of movement while the lawnmower is being propelled by the operator.

22 Claims, 8 Drawing Sheets

LAWNMOWER HANDLE ASSEMBLY

This application is a continuation-in-part of application Ser. No. 09/707,639 filed Nov. 7, 2000, now U.S. Pat. No. 6,449,935.

BACKGROUND OF THE INVENTION

1. Field of the Invention

The present invention relates to a handle assembly for lawnmowers and other wheeled appliances designed to be pushed by a human operator.

2. Description of the Related Art

Power lawnmowers designed to be pushed by a human being have traditionally been manufactured with a handle assembly connected to the mower deck proximate the rear wheels of the mower. The handlebars of these mowers are generally angled forward and downward at an angle of approximately 45 degrees. This means that when an operator applies a force along the handlebar, roughly one half of the force is directed downward instead of being directed forward to push the mower in the desired direction of travel, and the effect is even more pronounced when the operator attempts to push the mower up a hill or incline. This waste of effort causes the operator to suffer from unnecessary fatigue and makes the job of mowing more onerous than need be.

Currently, the primary options available to ease the strenuous burden of pushing a lawnmower involve purchasing self-propelled or riding mowers or hiring a lawn service to mow the lawn, all of which add to the expense of mowing. There remains the need for a simple yet inexpensive means for easing the burden of pushing a lawnmower, particularly up hills.

SUMMARY OF THE INVENTION

The present invention comprise an improved handle assembly for an appliance such as a lawnmower having front and rear wheels and which is adapted for pushing by a human operator. The handle assembly includes a handlebar which is connected to the mower deck through at least one mounting point proximate the front wheels and which extends upwardly and rearwardly until it terminates with a generally horizontal push bar adapted for gripping by the operator.

By mounting the handlebar to the mower deck at a position proximate the front wheels of the mower, the angle of the handlebar with respect to horizontal is reduced significantly, to something on the order of 25 degrees. This decrease in the angle of the handlebar results in a reduction of approximately 22 percent in the amount of force directed along the handlebar which is required to propel the mower forward. This labor saving effect can be increased by arcuately bowing the handlebar so that the angle of the upper portion of the handlebar is reduced to approximately 20 degrees, producing an overall savings in the force required to push the mower of approximately 25 percent. Pushable appliances other than lawnmowers such as handcarts and dollies can also benefit from the advantages obtained by use of a front-mounted handle assembly.

The handlebar is preferably pivotally mounted to the mower deck so that the mower deck can rise and fall with the terrain of the lawn while keeping the height of the push bar at a constant level which is comfortable for the operator. When the handlebar is so pivotally mounted, the handle assembly also includes a handle height control mechanism which is connected at a lower end to the appliance proximate the rear wheels and at an upper end to the handlebar at a point intermediate the front mounting point and the push bar. The handle height control mechanism allows the handlebar to pivot about the front mounting point through a limited range of movement. One embodiment of the handle height control mechanism includes a pair of telescoping assemblies, each of which has an inner member slidably received within an outer member; the outer member being pivotally connected to the appliance and the inner member being pivotally connected to the handlebar. The outer member includes an upper limit stop and a lower limit stop, and the inner member includes a plurality of longitudinally spaced adjustment holes which receive first and second limit stop pins. The first limit stop din is inserted into one of the adjustment holes above the upper limit stop and the second limit stop pin is inserted into one of the adjustment holes below the lower limit stop. The first limit stop pin engages the upper limit stop to prevent further downward movement of the handlebar when it reaches the lower limit of its selected range of movement and the second limit stop pin engages the lower limit stop to prevent further upward movement of the handlebar when it reaches the upper limit of its selected range of movement.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a handle assembly embodying the present invention. The handle assembly 1 is designed for use on an appliance 3 having at least one front wheel 5 and at least one rear wheel 7 which is propelled by being pushed by a human operator. The appliance 3 is generally depicted herein as being a power lawn mower having an engine 12 and a mower deck 13, however the handle assembly 1 could easily be adapted for use on other appliances 3 including but not being limited to various types of handcarts and dollies.

The handle assembly 1 generally comprises a handlebar 15 and a handle height control mechanism 17. A critical feature of the handle assembly 1 is that the handlebar 15 is connected to the mower or other appliance 3 at the front end thereof, proximate the front wheels 5, instead of at the rear end, proximate the rear wheels 7, as is common practice in the industry. By connecting the handle assembly 1 to the front of the appliance 3, it becomes easier for the operator to push the appliance 3 because the force vector applied to the appliance 3 through the handlebar 15 is directed in a direction which is more forward and less downward than is the case with conventional rear-attached handle assemblies. This effort-reducing effect is especially noticeable when the operator attempts to push the appliance 3 up a hill or incline.

The handlebar 15 is formed of a strong, stiff material such as tubular steel, and is depicted herein as being generally U-shaped, however in other applications the handlebar 15 could take on other configurations, such as being T-shaped. In its generally U-shaped configuration the handlebar 15 has a pair of legs 19 connected by a generally horizontal crosspiece or push bar 21. Each leg 19 of the handlebar 15 has a distal end 23 which is preferably pivotally connected proximate the front end of the appliance 3 at a mounting point 25, such as by a pin 27 inserted into aligned receivers passing through the leg 19 and a respective upstanding flange 29 connected to the mower deck 13 proximate a respective front wheel 5. Pivotal mounting of the handlebar 15 allows the mower deck 13 to rise and fall with the terrain of the lawn while keeping the height of the push bar 21 at a relatively constant level which can be adjusted so as to accommodate operators of varying heights. It is foreseen, however, that in some circumstances a handlebar 15 which is fixedly connected to the appliance 3 might be acceptable or even preferable to pivotal mounting.

The legs 19 of the handlebar 15 each generally slope upwardly and rearwardly from the respective mounting point 25 toward the push bar 21 and preferably include an arcuate bend 31 which further accentuates the effort-reducing effect of the handle assembly 1 by flattening out the angle with respect to horizontal of both the handlebar 15 and the resultant force vector acting through the handlebar 15.

For purposes of shipping and storing the mower 3, the handlebar 15 preferably includes a lower handlebar section 33 and an upper handlebar section 35 connected by pivotal mountings 37. Both the lower handlebar section 33 and the upper handlebar section 35 are substantially U-shaped and have legs 19a and 19b respectively which form portions of the handlebar legs 19. The legs 19b of the upper handlebar section 35 are connected by the push bar 21, and the legs 19a of the lower handlebar section 33 are connected by an intermediate crossbar 39. The pivot mountings 37 can be constructed in any of a variety of known manners so that the upper handlebar section 35 is foldable relative to the lower handlebar section 33 between a retracted position and an extended position, and is lockable in the extended position.

The handle height control mechanism 17 serves to limit the range of movement of the handlebar 15 as it pivots about the front mounting points 25. It is desirable that the handlebar 15 be allowed to pivot as the mower 3 is pushed over irregularities in the ground, thereby allowing the push bar 21 to be held at a constant height which is comfortable for the operator. The range of movement, however, should have a lower limit which is set so as to allow the operator to push downward on the push bar 21 to raise the front wheels 5 of the mower 3 off of the ground and pivot the mower 3 about its rear wheels 7 for turning purposes. For the sake of safety, the upper limit of movement of the handlebar 15 should be set so as to prevent the handlebar 15 from pivoting so far forward as to allow the operator's feet from coming into contact with the mower blades.

While the height control mechanism 17 could take a variety of forms including something as simple as a length of chain or a hydraulic strut, it preferably comprises a pair of telescoping members 41 connected between the handlebar 15 and a suitable structure of the appliance 3, such as the mower deck 13. The telescoping members 41 each include an elongate inner member or rod 43 which is slidably mounted within a respective elongate outer member, channel or bracket 45.

The brackets 45 each have a lower end which is pivotally connected to the appliance 3 at a mounting point 47 proximate the rear wheels 7, such as by a pin 49 inserted in aligned receivers passing through the bracket 45 and a respective upstanding flange 51 fixedly connected to the mower deck 13. The upper ends of the brackets 45 each have a respective, generally horizontal, upper flange or limit stop 53 which includes a circular receiver 55 for accepting the rod 43. A lower flange or limit stop 57 fixedly connected to each bracket 45 and spaced downwardly from the top flange 53 includes a circular receiver 59 which also accepts the rod 43. It is foreseen that in some applications a single flange could function as both the upper limit stop 53 and the lower limit stop 57.

The rods 43 each have an upper end which is pivotally connected to the handlebar 15 intermediate the distal ends 23 of the legs 19 and the push bar 21, such as by a pin 61 inserted into aligned receivers passing through the rod 43 and a respective depending flange 63 connected to the intermediate crossbar 39. The lower ends of the rods 43 are each accepted by respective receivers 55 and 59 of the brackets 45, such that the rods 43 are slidably retained within the brackets 45 and telescope with respect to the brackets 45 as the handlebar 15 pivots about the pin 27 of the front mounting point 25.

Each of the rods 43 includes a plurality of longitudinally spaced adjustment holes 65 sized to receive upper and lower limit stop pins, such as hairpins 67 and 69 respectively, the upper hairpin 67 being placed through one of the adjustment holes 65 in a location above the bracket upper flange 53, and the lower hairpin 69 being placed through another of the adjustment holes 65 in a location below the bracket lower flange 57.

As the handlebar 15 pivots downward about the front mounting point 25, the upper hairpins 67 come into contact with the upper surfaces of the bracket upper flanges 53, thereby defining the lower limit of movement of the handlebar 15. Conversely, as the handlebar 15 pivots upward about the front mounting point 25, the lower hairpins 69 come into contact with the lower surface of the bracket lower flanges 57, thereby defining the upper limit of movement of the handlebar 15. Having a plurality of adjustment holes 65 in the rods 43 allows the telescoping members 41 to be adjusted so that the height of the push bar 21 and the range of movement of the handlebar 15 can be tailored to fit each individual operator. The adjustment is accomplished by simply relocating the upper and lower hairpins 67 and 69 to different adjustment holes 65.

Although the telescoping members 41 have been described herein as having a lower end of the outer member 45 connected to the appliance 3 and an upper end of the inner member 43 connected to the handlebar 15, it should be apparent to a person having ordinary skill in the art that this arrangement could be easily reversed so that a lower end of the inner member 43 is connected to the appliance 3 and an upper end of the outer member 45 is connected to the handlebar 15. Furthermore, the respective locations and configuration of the limit stops 51, 53 and the limit stop pins 67, 69 could be varied from the embodiment described herein; i.e. the limit stops 51, 53 could be connected to the inner member 43 instead of the outer member 45 and engage limit stop pins 67, 69 connected to the outer member 45. The limit stop pins 67, 69 could also be located between the limit stops 51, 53 instead of respectively above and below them. All that is required of the limit stops is that the pivoting action of the handlebar 15 be constrained between an upper limit and a lower limit if the handlebar 15 is pivotally connected to the appliance 3.

The handle assembly 1 may further include a front crossbar 71 connected between the legs 19 of the handlebar 15 forward of the center of gravity of the appliance 3. The crossbar 71 provides a handle by which the appliance 3 may be lifted, such as when loading and unloading the appliance 3 into and out of a vehicle.

Figure 1:
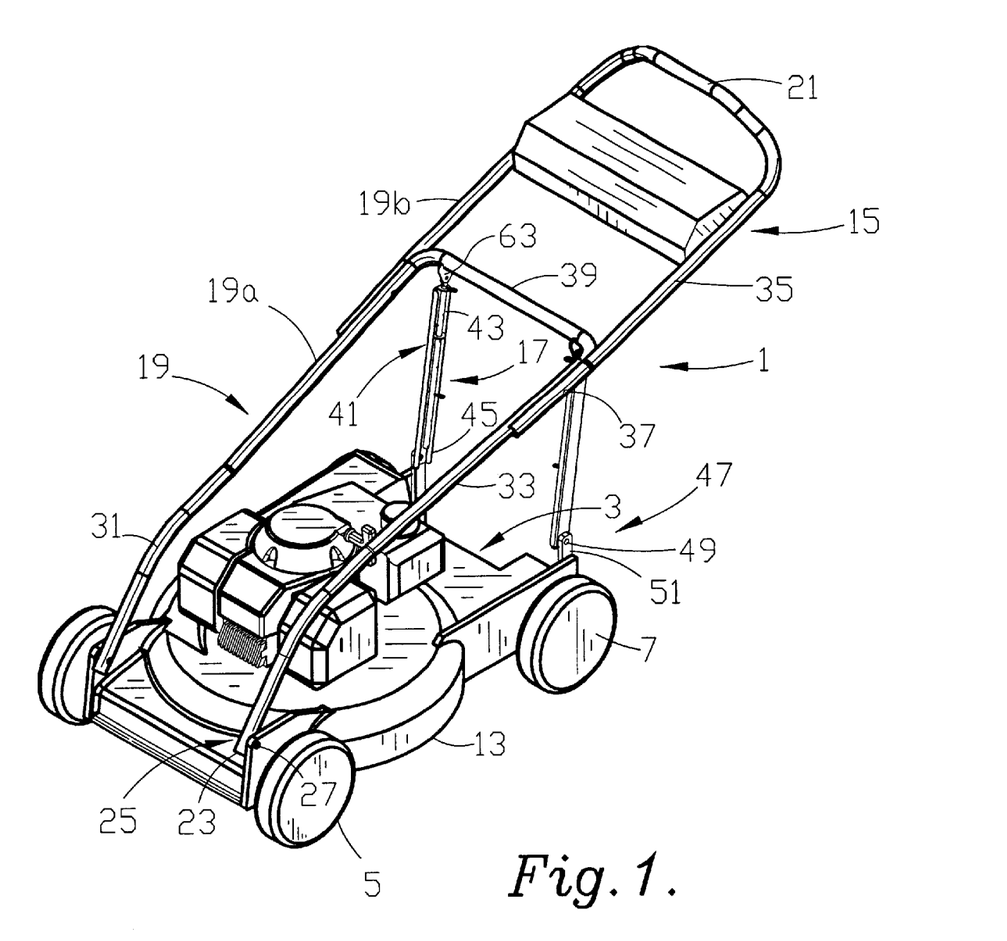
FIG. 1 is a perspective view of a lawnmower equipped with a handle assembly embodying the present invention.
Figure 2:
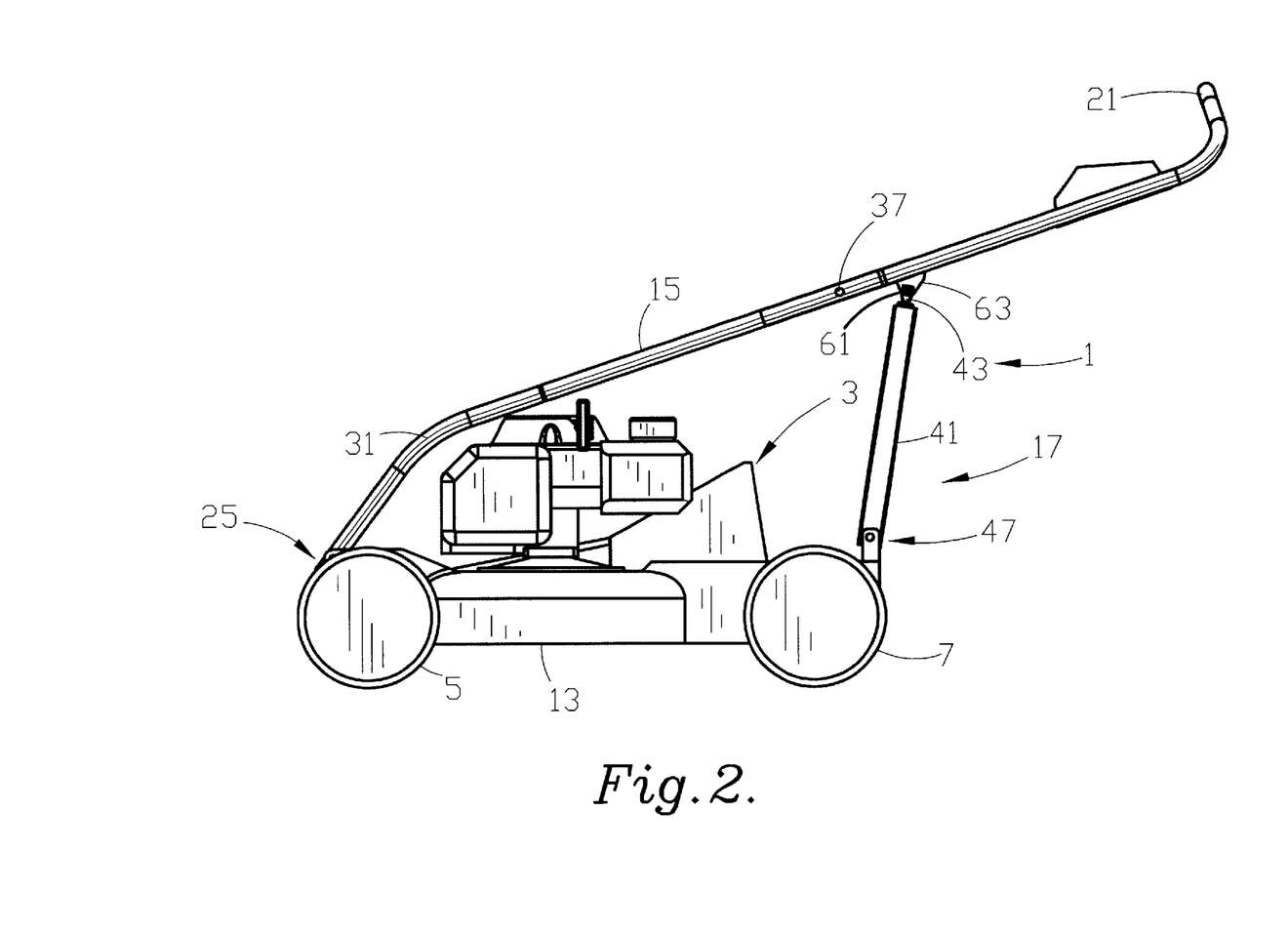
FIG. 2 is a side view of the lawnmower and handle assembly of FIG. 1.
Figure 3:
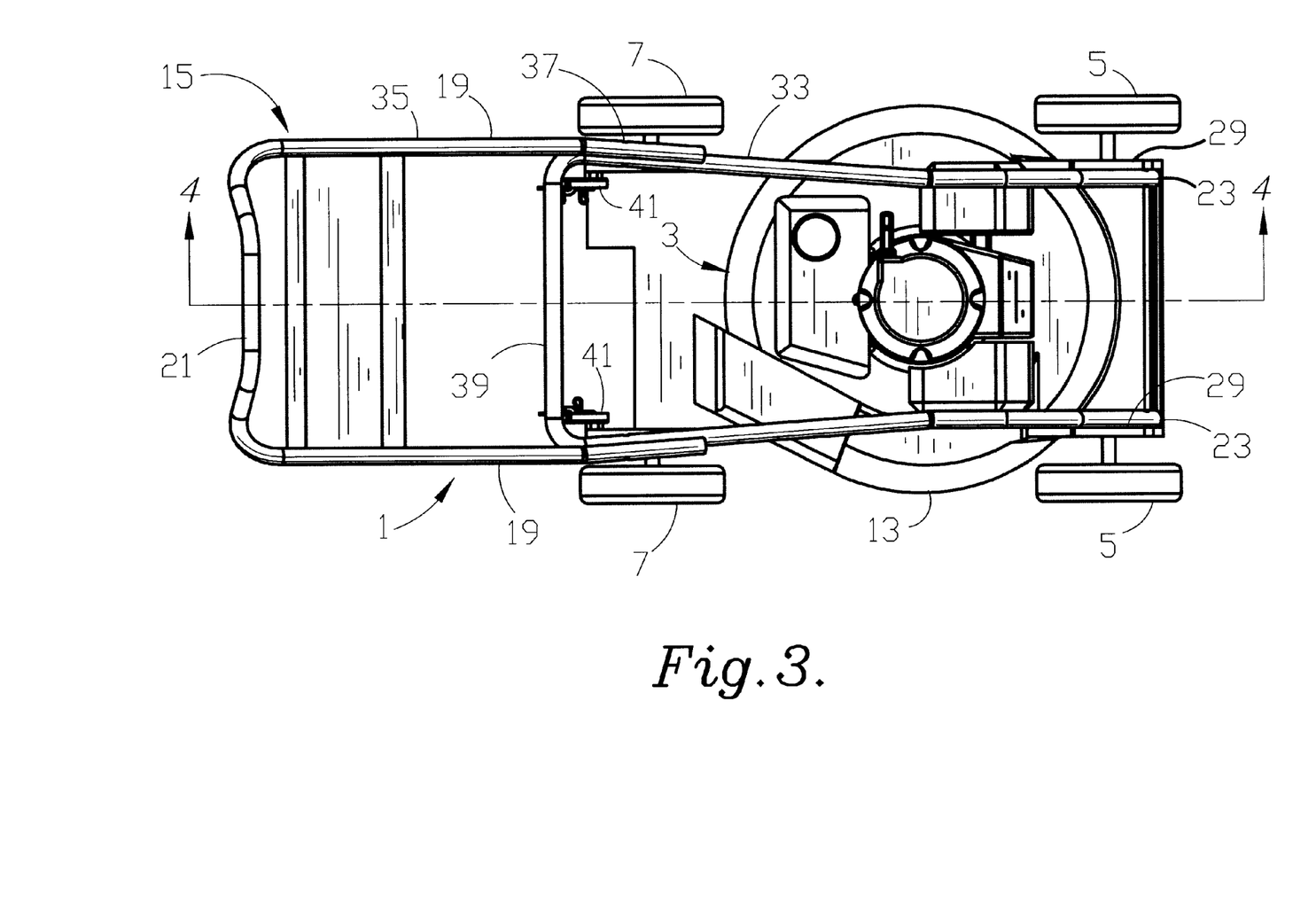
FIG. 3 is a top view of the lawnmower and handle assembly of FIG. 1.
Figure 4:
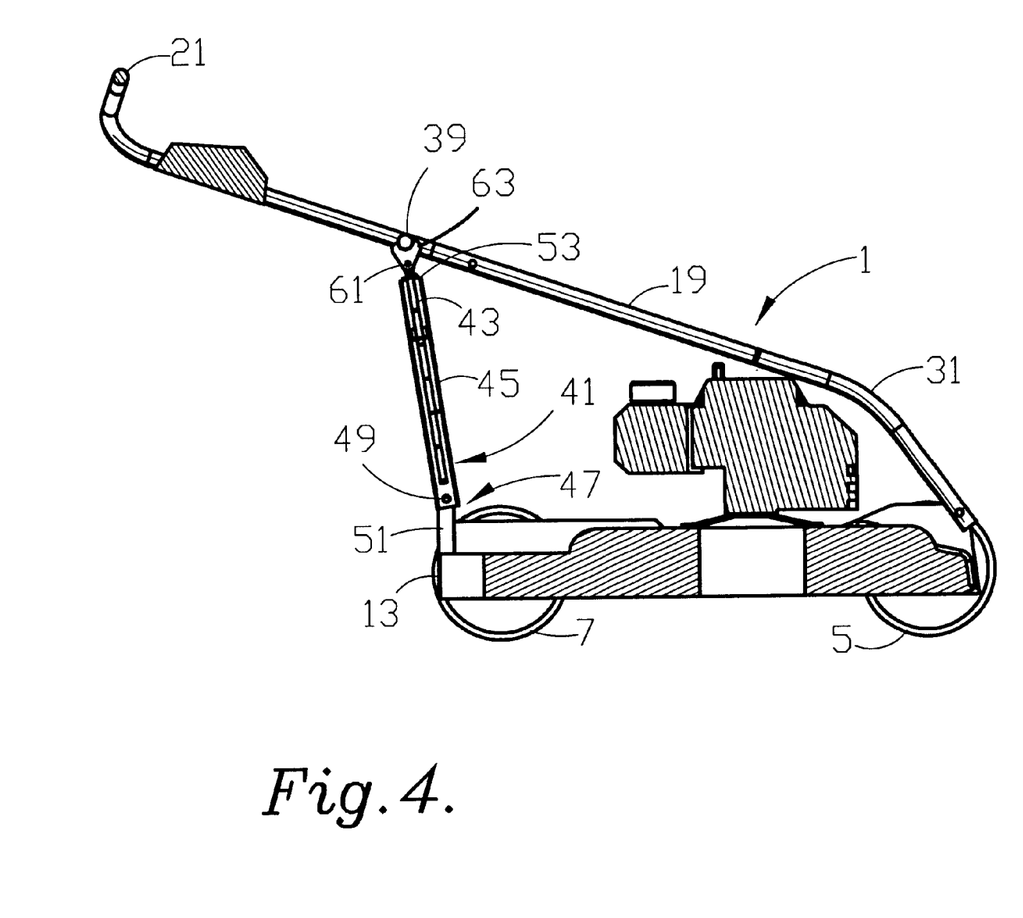
FIG. 4 is a cross-sectional view of the lawnmower and handle assembly of FIG. 1 taken generally along line 4—4 in FIG. 3.
Figure 5:
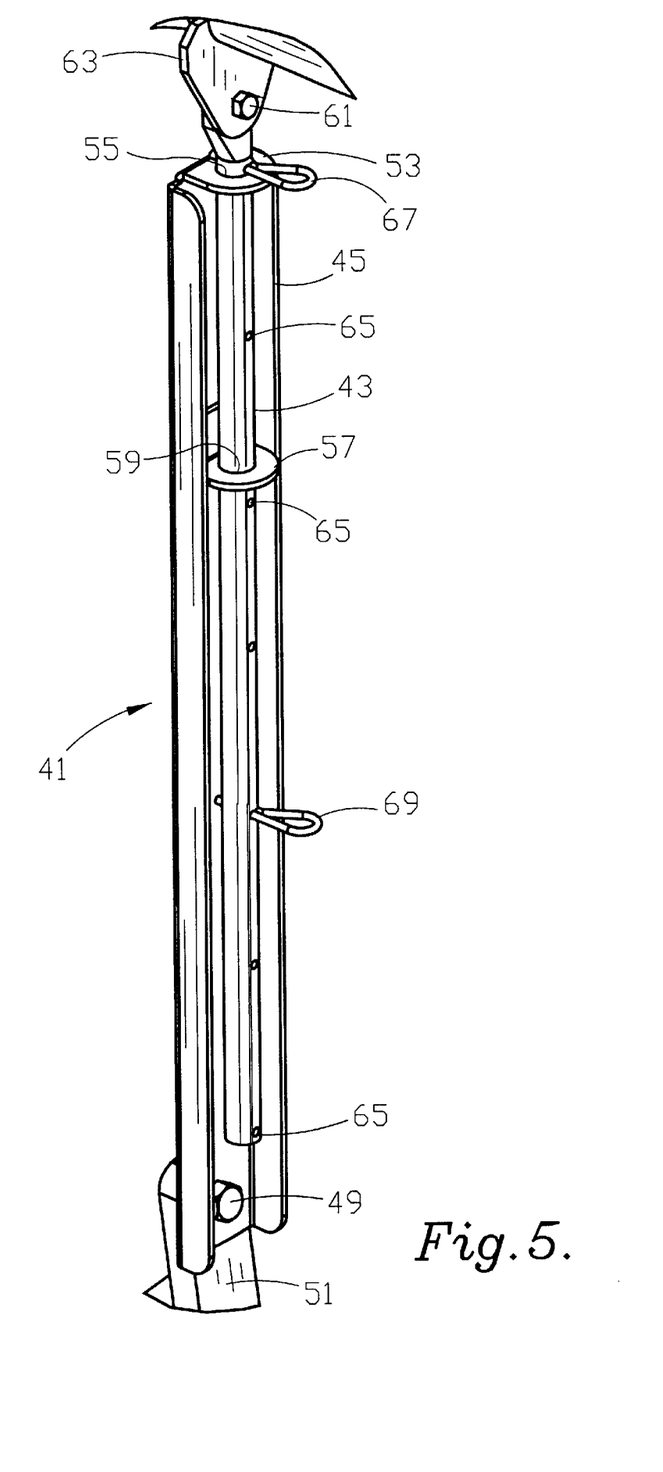
FIG. 5 is an enlarged perspective view of one of the telescoping handle height control assemblies of the handle assembly of FIG. 1.
Figure 6:
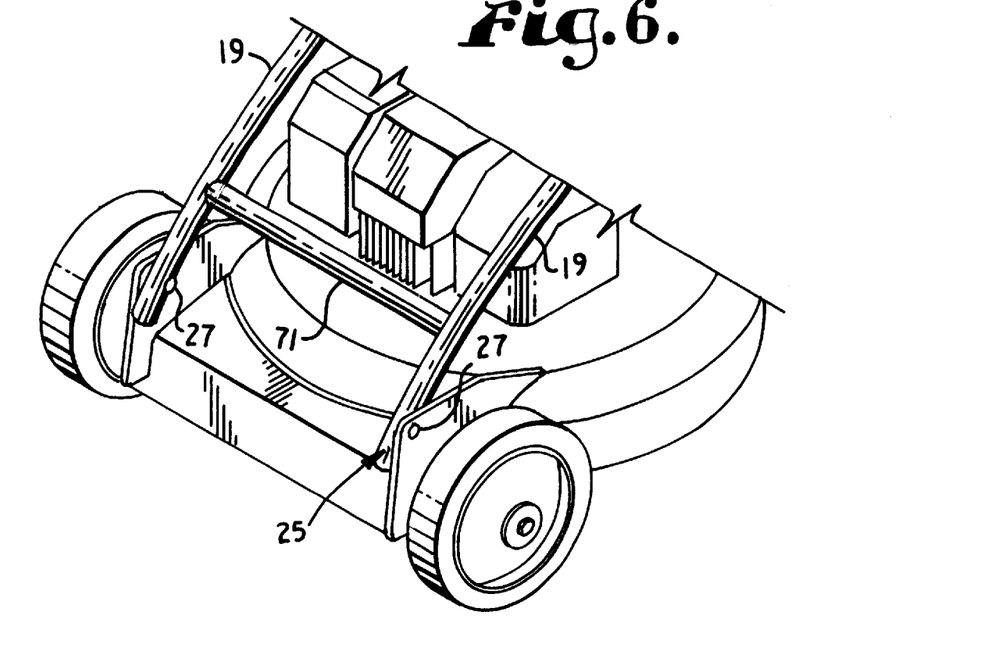
FIG. 6 is a fragmentary perspective view of a first alternative embodiment of the handle assembly.
Figure 7:
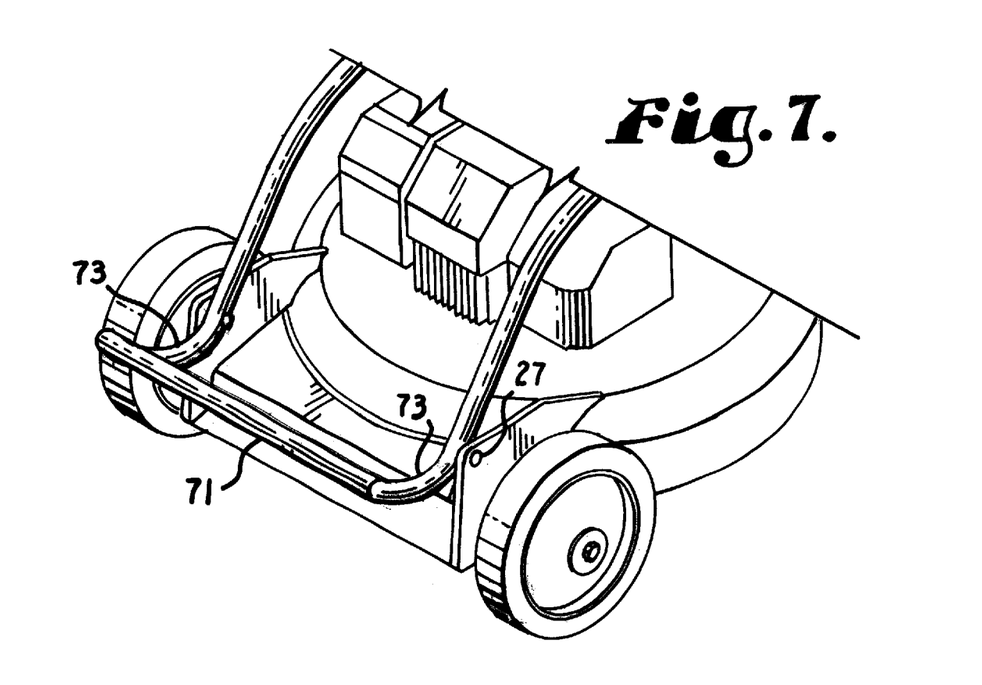
FIG. 7 is a fragmentary perspective view of a second alternative embodiment of the handle assembly.
Figure 8:
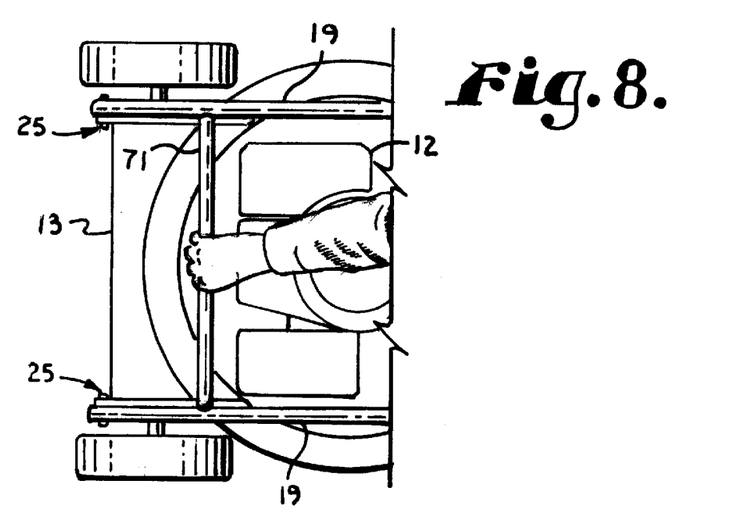
FIG. 8 is a fragmentary top view of the first alternative embodiment of the handle assembly.

The precise location of the front crossbar 71 may vary somewhat, so long as it is located forward of the center of gravity of the appliance 3. For example, the front crossbar may be mounted inboard of the front mounting points 25, but well forward of the engine 12 as shown in FIGS. 6 and 8. Alternatively, the legs 19 of the handlebar 15 may each include an upwardly curved horn 73 forward of the respective front mounting point 25, and the front crossbar 71 may be mounted between the horns 73 as shown in FIG. 7.

Figure 9:
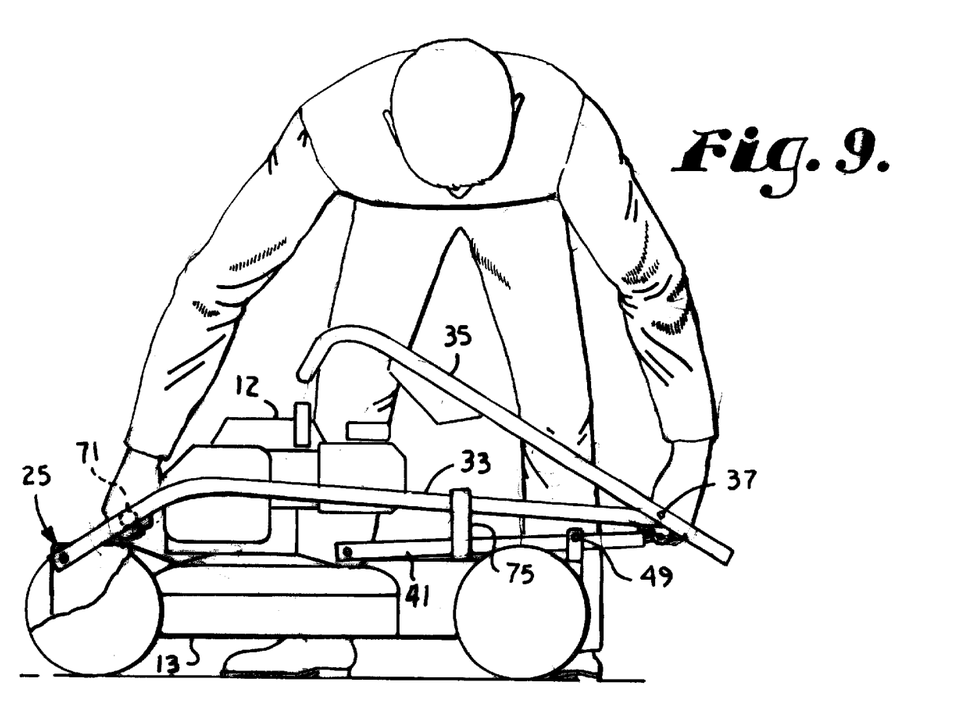
FIG. 9 is a side view of the first alternative embodiment of the handle assembly showing the lawnmower being lifted using the handle assembly.

Referring to FIG. 9, either of the previously described locations for the front crossbar 71 will allow the handle assembly 1 to be fully folded for transport, because the engine 12 will not interfere with the front crossbar 71. To fold the handle assembly 1, the telescoping members 41 are first disconnected at either the lower pivot pin 49 (as shown) or at the upper pivot pin 61. The lower handlebar section 33 can then be pivoted downwardly against the mower deck 13. The pivot mountings 37 can then be released such that the upper handlebar section 35 may be folded forwardly over the lower section 33. It is also foreseen that a catch or latch 75 may be provided for retaining the lower handlebar section 33 in the folded position.

Referring again to FIG. 9, with the handle assembly 1 fully folded and the lower handlebar 33 latched in the folded position, the appliance 3 may be lifted by grasping the front crossbar 71 with one hand (as seen in FIG. 8) and the intermediate crossbar 39 with the other. If no latch 75 is provided, the appliance 3 may be lifted by grasping the front crossbar 71 with one hand and the rear edge of the mower deck 13 with the other (not shown).

Figures 10, 11, 12:
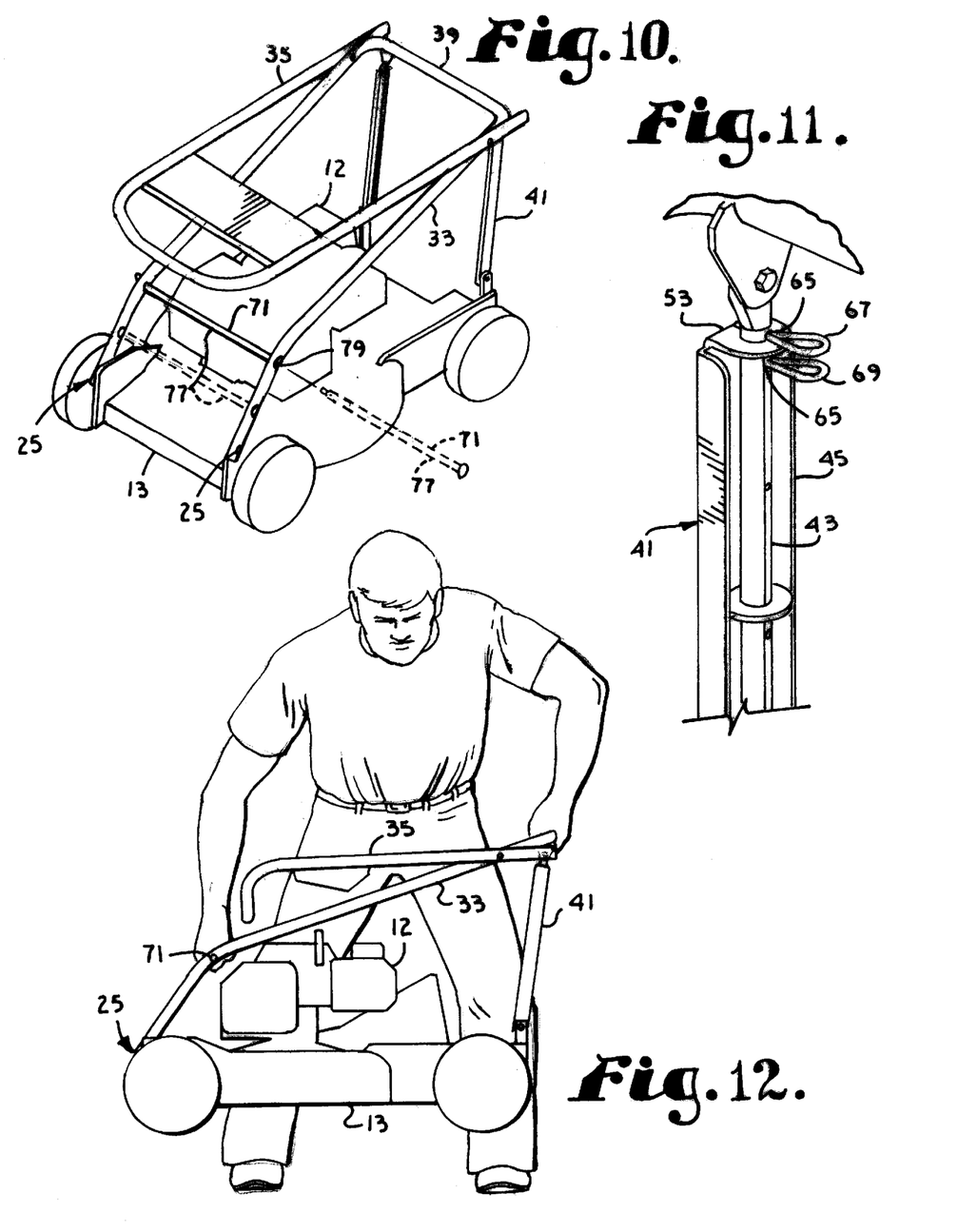
FIG. 10 is a perspective view of a third alternative embodiment of the handle assembly.
FIG. 11 is an enlarged fragmentary perspective view of one of the telescoping handle members of the handle assembly showing the telescoping member locked in the lowest possible position.
FIG. 12 is a side view of the third alternative embodiment of the handle assembly showing the lawnmower being lifted using the handle assembly.

Referring to FIG. 10, a third possible location for the front crossbar 71 is forward of the center of gravity of the appliance 3, but farther rearward, and thus closer to the engine 12, than previously described. Fixing the front crossbar 71 in such a location would prevent the handle assembly from being fully folded because the engine 12 would interfere with the crossbar 71, however this problem can be alleviated by making the front crossbar removable from the handle assembly 1. For example, the front crossbar 71 may be a rod 77 slidably receivable through respective holes 79 in the legs 19 of the handle assembly 1. The front crossbar 71 can also be selectively moveable between the rearward position to a forward position indicated by the dashed lines in FIG. 10. The forward position may be used for storage of the front crossbar 71 during shipping or storage of the appliance 3 in the fully folded position, or may be used for lifting the appliance 3 in the fully folded position as previously described with respect to the embodiment shown in FIGS. 8 and 9.

With the front crossbar 71 in its rearward position, the appliance 3 can be partially compressed for transport or storage by locking the handle height control mechanism 17 in its lowest possible position (as shown in FIG. 11) so as to rigidly or fixedly secure the lower handlebar section 33 relative to the mower deck 13. As shown in FIG. 11, the rod 43 of each telescoping member 41 may include a pair of closely spaced adjustment holes 65 extending on opposite sides of the upper flange 53 when the rods 43 are fully retracted. With the rods 43 fully retracted, limit stop pins 67 and 69 can be inserted into the closely spaced adjustment holes 65 on opposite sides of the upper flange (or one of the pins could be place in the adjustment hole 65 just under upper flange 53) to restrain the handle bar section 35 from pivoting upward. The pivot mountings 37 can then be released such that the upper handlebar section 35 may be folded forwardly over the lower section 33, as shown in FIG. 12. The appliance 3 can then be comfortably lifted by grasping the front crossbar 71 with one hand and the intermediate crossbar 39 with the other.

The handle assembly 1 can be sold either as original equipment on an appropriate appliance 3 or as an aftermarket add-on wherein an existing appliance 3 can be retrofitted with the improved handle assembly 1. Some existing lawnmower decks 13 are already equipped with the front mounting flanges 29 required for mounting the handlebar 15, needing only to have a receiver bored there through for receiving the pivot pin 27. Other existing mower decks 13 lack the flanges 29, but in these instances flanges 29 can be added to the deck 13 by being bolted on or otherwise attached. It is also foreseen that the handlebars could be mounted to the deck 13 without flanges 29. In most cases, the existing rear-mount handlebar attaching points can be used to form the rear mounting points 47 for connecting the height control mechanism 17 to the mower deck 13.

It is to be understood that while certain forms of the present invention have been illustrated and described herein, it is not to be limited to the specific forms or arrangement of parts described and shown. For example, it is foreseen that the handle height control mechanism 17 could take on an entirely different configuration from the telescoping members 41 described herein, and it is not required that it be connected to the appliance 3 proximate the rear wheels 7. A front mounting point 25 which allows the handlebar 15 to pivot between fixed upper and lower limits would also provide a handle assembly 1 within the scope of the present invention. It is also foreseen that a wide variety of means could be utilized for removably connecting the crossbar 71 to the handle assembly 1. It is also foreseen that the crossbar 71 could take a wide variety of forms such as a tube with ends designed to clamp around, wrap around or bolt onto the opposed legs 19 of the handle assembly 1.

What is claimed and desired to be secured by Letters Patent is as follows:

1. A lawnmower having a center of gravity and being adapted for pushing by a human operator, said lawnmower comprising:
   a) a mower deck;
   b) at least one front wheel rotatably connected to and supporting said mower deck at a front end thereof and at least one rear wheel rotatably connected to and supporting said mower deck at a rear end thereof;
   c) a handlebar having a pair of legs, each said leg being connected to said mower deck at a respective front mounting point proximate the lawnmower front end and selectively pivotal relative to said mower deck while said lawnmower is being propelled by the operator, said handlebar extending upwardly and rearwardly from said front mounting points and terminating at a push bar adapted for gripping by the operator, said handlebar further including a front crossbar connected between said legs forward of the center of gravity of said lawnmower.

2. The lawnmower as in claim 1 and further including a handle height control mechanism connected at a lower end to the mower deck at a rearward mounting point and at an upper end to said handlebar, said handle height control mechanism allowing said handlebar to pivot about the front mounting point through a limited range of movement.

3. The lawnmower as in claim 2, wherein said handle height control mechanism comprises a telescoping assembly having a first member slidably secured to a second member; a distal end of said first member being pivotally connected to said mower deck at said rear mounting point; and a distal end of said second member being pivotally connected to said handlebar.

4. The lawnmower as in claim 3, wherein said telescoping assembly includes upper limit stop means for preventing said handlebar from pivoting beyond an upper limit of the limited range of motion of said handlebar, and said telescoping assembly includes lower limit stop means for preventing said handlebar from pivoting beyond a lower limit of the limited range of motion of said handlebar.

5. The lawnmower as in claim 4 further comprising means for adjusting the upper limit of the limited range of motion of said handlebar established by said upper limit stop means.

6. The lawnmower as in claim 4 further comprising means for adjusting the lower limit of the limited range of motion of said handlebar established by said lower limit stop means.

7. The lawnmower as in claim 1, wherein said front crossbar is connected to each said leg rearward of the respective front mounting point.

8. The lawnmower as in claim 1, wherein each said leg includes an upwardly curved horn forward of the respective front mounting point and said front crossbar is connected between said horns.

9. The lawnmower as in claim 1, wherein said front crossbar is removably connected to each said leg.

10. A lawnmower adapted for pushing by a human operator and comprising:
    a) a mower deck;
    b) at least one front wheel rotatably connected to and supporting said mower deck at a front end thereof and at least one rear wheel rotatably connected to and supporting said mower deck at a rear end thereof;
    c) a handlebar having a pair of legs, each said leg being pivotally connected to said mower deck at a respective front mounting point proximate the lawnmower front end, said handlebar extending upwardly and rearwardly from said front mounting points and terminating at a push bar adapted for gripping by the operator, said handlebar further including a front crossbar connected between said legs forward of the center of gravity of said lawnmower, said handlebar being pivotable relative to said mower deck while said lawnmower is being propelled by the operator;
    d) lower limit stop means preventing said handlebar from pivoting beyond a lower limit of a limited range of motion of said handlebar; and
    e) upper limit stop means preventing said handlebar from pivoting beyond an upper limit of a limited range of motion of said handlebar.

11. The lawnmower as in claim 10 further comprising means for adjusting the upper limit of the limited range of motion of said handlebar established by said upper limit stop means.

12. The lawnmower as in claim 10 further comprising means for adjusting the lower limit of the limited range of motion of said handlebar established by said lower limit stop means.

13. The lawnmower as in claim 10, wherein said front crossbar is connected to each said leg rearward of the respective front mounting point.

14. The lawnmower as in claim 10, wherein each said leg includes an upwardly curved horn forward of the respective front mounting point and said front crossbar is connected between said horns.

15. The lawnmower as in claim 10, wherein said front crossbar is removably connected to each said leg.

16. A lawnmower adapted for pushing by a human operator and comprising:
    a) a mower deck;
    b) at least one front wheel rotatably connected to and supporting said mower deck at a front end thereof and at least one rear wheel rotatably connected to and supporting said mower deck at a rear end thereof;
    c) a handlebar having a pair of legs, each said leg being pivotally connected to said mower deck at a respective front mounting point proximate the lawnmower front end, said handlebar extending upwardly and rearwardly from said front mounting points and terminating at a push bar adapted for gripping by the operator, said handlebar further including a front crossbar connected between said legs forward of the center of gravity of said lawnmower, said handlebar being pivotable relative to said mower deck while said lawnmower is being propelled by the operator; and
    d) a handle height control mechanism connected to said mower deck and comprising a lower limit stop adapted to prevent said handlebar from pivoting beyond a lower limit of a limited range of motion of said handlebar and an upper limit stop adapted to prevent said handlebar from pivoting beyond an upper limit of a limited range of motion of said handlebar.

17. The lawnmower as in claim 16 further comprising means for adjusting the upper limit of the limited range of motion of said handlebar established by said upper limit stop means.

18. The lawnmower as in claim 16 further comprising means for adjusting the lower limit of the limited range of motion of said handlebar established by said lower limit stop means.

19. The lawnmower as in claim 16, wherein said front crossbar is connected to each said leg rearward of the respective front mounting point.

20. The lawnmower as in claim 16, wherein each said leg includes an upwardly curved horn forward of the respective front mounting point and said front crossbar is connected between said horns.

21. The lawnmower as in claim 16, wherein said front crossbar is removably connected to each said leg.

22. A lawnmower having a center of gravity and being adapted for pushing by a human operator, said lawnmower comprising:
 a) a mower deck;
 b) at least one front wheel rotatably connected to and supporting said mower deck at a front end thereof and at least one rear wheel rotatably connected to and supporting said mower deck at a rear end thereof; c) a handlebar having a pair of legs, each said leg being pivotally connected to said mower deck at a respective front mounting point proximate the lawnmower front end so as to be selectively pivotal relative to said mower deck while said lawnmower is being propelled by the operator, said handlebar extending upwardly and rearwardly from said front mounting points and terminating at a push bar adapted for gripping by the operator, said handlebar further including a front crossbar connected between said legs forward of the center of gravity of said lawnmower.

\* \* \* \* \*